(12) United States Patent
Goossens et al.

(10) Patent No.: US 7,582,709 B2
(45) Date of Patent: Sep. 1, 2009

(54) PROCESS AND APPARATUS FOR MANUFACTURING ETHYLENE POLYMERS AND COPOLYMERS

(75) Inventors: Ivo T. Goossens, Kapelle-Op-Den-Bos (BE); Fausto F. Ciancio, Veerle-Laakdal (BE); Paul Clymans, Kapelle-op-den-bos (BE); Philip H. Cornelissen, Heverlee (BE); Martin J. Decoster, Diest (BE); Willy De Koster, Dilbeek (BE); Henri A. Lammens, Antwepen (BE); Tom Van Nuland, Baton Rouge, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 657 days.

(21) Appl. No.: 11/481,087

(22) Filed: Jul. 5, 2006

(65) Prior Publication Data
US 2007/0032614 A1    Feb. 8, 2007

Related U.S. Application Data

(60) Provisional application No. 60/705,935, filed on Aug. 5, 2005.

(51) Int. Cl.
*C08F 2/02* (2006.01)
*B01J 19/24* (2006.01)
*C08F 10/02* (2006.01)

(52) U.S. Cl. .............................. 526/64; 526/73; 526/86; 526/918; 526/920; 422/134; 422/138

(58) Field of Classification Search ................... 526/64, 526/73, 86, 918, 920; 422/134, 138
See application file for complete search history.

(56) References Cited

U.S. PATENT DOCUMENTS

| 3,628,918 | A |   | 12/1971 | Beals et al. |         |
|-----------|---|---|---------|--------------|---------|
| 3,809,688 | A | * | 5/1974  | Clementi et al. | 528/501 |
| 4,175,169 | A |   | 11/1979 | Beals et al. |         |
| 4,260,722 | A |   | 4/1981  | Pfleger et al. |       |
| 2003/0162913 | A1 | | 8/2003 | Haffner et al. |      |

FOREIGN PATENT DOCUMENTS

| GB | 1 338 280 | 6/1971 |
| WO | WO 2004/108271 | 12/2004 |
| WO | WO 2005/014672 | 2/2005 |

OTHER PUBLICATIONS

P. Erlich et al.; *"Fundamentals of the Free-Radical Polymerization of Ethylene,"* Advances in Polymer Science, vol. 7, pp. 386-448, 1970.

* cited by examiner

*Primary Examiner*—Fred M Teskin

(57) ABSTRACT

The invention relates to a process for the manufacture of ethylene polymers and copolymers in which ethylene is compressed in a primary compressor at a throughput of at least 55 tonnes/hour, mixed with recycled ethylene and further compressed in a two-stage reciprocating secondary compressor having at least 14 cylinders to a pressure of at least 2300 bar at a throughput of at least 120 tonnes/hour, heating at least a portion of that ethylene to a temperature of at least 95° C. and introducing it into a tubular reactor of diameter at least 65 mm and a length of at least 1500 m, introducing initiator in at least three reaction zones to give a conversion of at least 28% and maintaining a pressure drop over the reactor to maintain a flow velocity of at least 6 m/s.

18 Claims, 1 Drawing Sheet

PROCESS AND APPARATUS FOR MANUFACTURING ETHYLENE POLYMERS AND COPOLYMERS

CROSS REFERENCE TO RELATED APPLICATIONS

This application claims the benefit of Provisional Application No. 60/705,935 filed Aug. 5, 2005, the disclosure of which is fully incorporated herein by reference.

FIELD OF THE INVENTION

This invention relates to a process of manufacturing ethylene polymers and copolymers at high pressure in a tubular reactor and to a production plant for carrying out the process.

BACKGROUND OF THE INVENTION

Tubular reactors have become established over the past 70 years as a means of producing low and medium density polyethylene and ethylene copolymers. Such tubular reactors are large scale installations and typically operate at a pressure in excess of 2000 bar and sometimes as high as 3100 bar. It is believed that no other large scale industrial production process operates at a higher pressure.

It is well known that the economics of low density polyethylene manufacture strongly favour operating at a large scale and, therefore, there has been a long standing desire to develop tubular reactors of higher capacity. However, the operation of tubular polymerization reactors is subject to special considerations. Firstly, the extreme pressures must be handled in a safe manner. Secondly, commercial viability requires that the reactor operates as efficiently as possible with respect to the energy consumed and with respect to the conversion of monomer into polymer, with a minimum of downtime over a lifetime, which is typically decades. Unplanned downtime caused by equipment failure is particularly undesirable because the ethylene feed typically comes direct from a cracker which cannot be shut down without incurring very high cost, and so the ethylene must either be diverted under special arrangements with consequent disruption, if possible, or flared off with a consequent cost and waste of resources.

The demands placed on equipment, especially the compressors, increase as the scale of operation is increased, thereby making it more difficult to achieve the optimal operation required for economic viability. Moreover, because the polymerization process is strongly exothermic, the rate at which a reactor facility can produce polymer is limited by the rate at which heat can be removed, and therefore an increase in capacity can lead to problems associated with heat removal.

The above-mentioned factors, coupled with the difficulty of doing meaningful trials on a small scale, mean that any new design of reactor facility involves considerable challenges, which increase as the planned scale of the facility increases. For that reason, amongst others, for a long period of time activity has concentrated on the incremental increase in capacity of existing tubular reactors by debottlenecking, and there was no attempt to build new facilities with nominal capacities greater than those already proven, say, of 300 kilotonnes per annum (ktpa) or more, despite the economic benefits of operating at a larger scale.

Recently, however, a tubular reactor for polyethylene production of a nominal capacity of around 320 ktpa has been built and commissioned. It is believed, however, that the facility has experienced problems leading to undesirably high downtime. Accordingly, there remains a need for a design of a production facility and process for the manufacture of polyethylene and ethylene copolymers in a tubular reactor operating at high efficiency and reliability on a scale of greater than 300 ktpa.

SUMMARY OF THE INVENTION

The present invention provides a process for the manufacture of ethylene polymers and copolymers comprising the steps of:

compressing ethylene in a primary compressor at a throughput of at least 55 tonnes/hour and then mixing that ethylene with recycled ethylene and further compressing the mixed ethylene to a pressure of at least 2300 bar at a throughput of at least 120 tonnes/hour in a two-stage reciprocating secondary compressor having at least 14 cylinders, heating at least a portion of the further compressed mixed ethylene to a temperature of at least 95° C. and introducing that heated ethylene into the front end of a tubular reactor having an internal diameter of at least 65 mm and a length of at least 1500 m, introducing one or more initiators into the tubular reactor in at least three separate locations, thereby defining at least three reaction zones, allowing ethylene to polymerize, and cooling the reaction mixture in at least the first two reaction zones, thereby converting at least 28% of the monomer to polymer, maintaining a pressure drop over the length of the tubular reactor such as to maintain a flow velocity in the tubular reactor of at least 6 m/s, and releasing the reaction mixture through a high-pressure, let-down valve, cooling the reaction mixture, separating the reaction mixture into polymer and unreacted ethylene, and recycling unreacted ethylene.

The process of the invention provides a reliable, efficient method of manufacture of a wide variety of ethylene polymers and copolymers at a larger scale, which meets the requirements of mechanical robustness and efficient heat removal to give high conversion. In particular, the process of the invention is especially applicable to processes having a production from a single tubular reactor of 300 kilotonnes per annum (ktpa) or more and it is believed that it allows viable operation at or above 400 ktpa, for example, at 450 ktpa and higher. That capacity represents a major advance in capacity over existing tubular reactor production facilities.

DETAILED DESCRIPTION OF THE INVENTION

Figure 1:
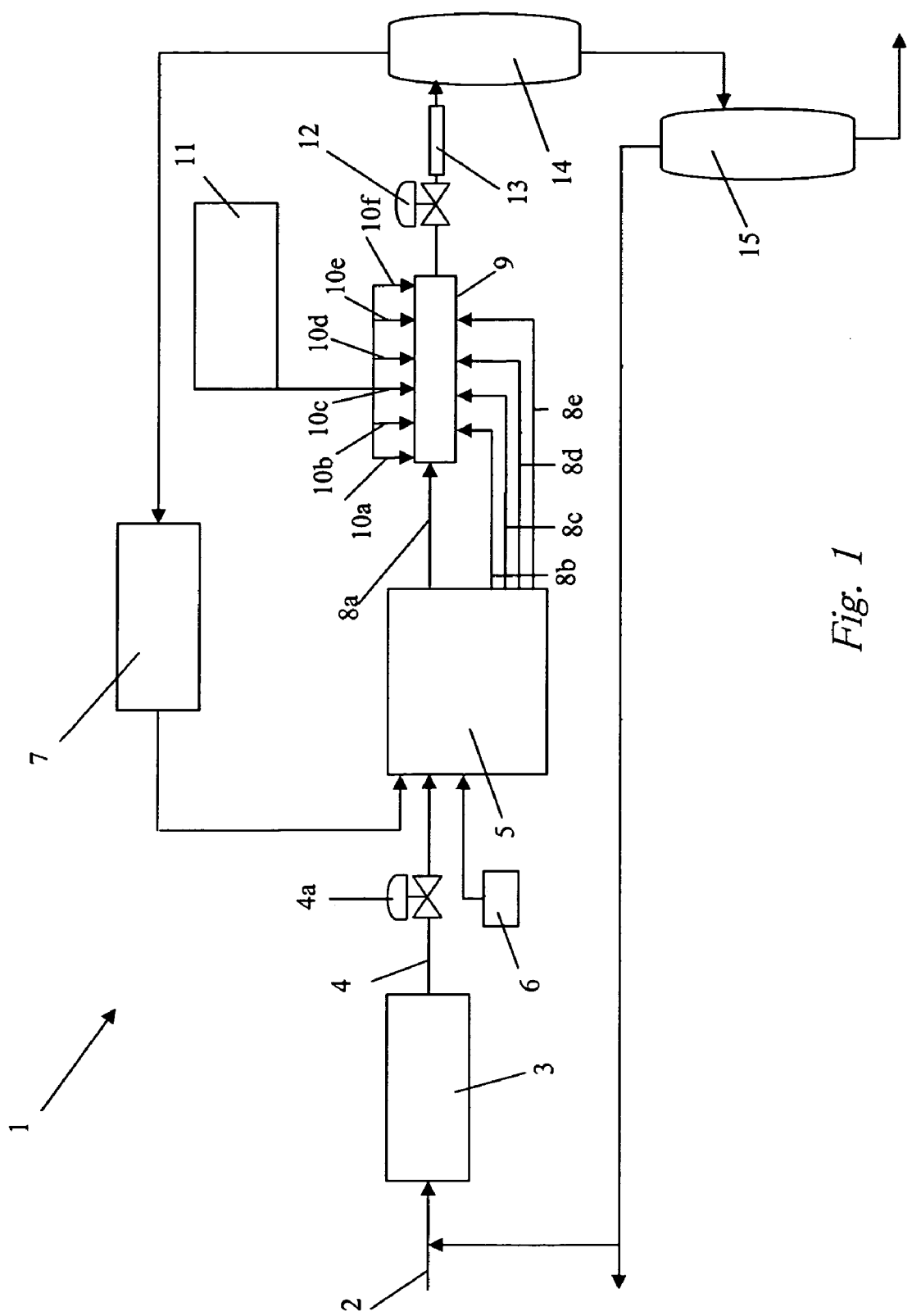
FIG. 1 shows schematically an ethylene polymerization plant or apparatus according to the invention.

A production facility and process for the manufacture of polyethylene and ethylene copolymers in a tubular reactor operating at high efficiency and reliability on a scale of greater than 300 ktpa by having a primary compressor that operates at a throughput of at least 55 tonnes/hour and a secondary compressor preferably having at least 14 cylinders and operating at a throughput of at least 120 tonnes/hour to compress the mixed ethylene to a pressure of at least 2300 bar is hereinafter discussed in detail.

The function of the primary compressor is to pressurize fresh ethylene (make-up ethylene) to the pressure of the ethylene recycle system, for feed to the secondary compressor. The primary compressor may be a single compressor, that alone pressurizes the ethylene to the pressure of the recycle stream, or it may be two or more compressors in series or in parallel that, in combination, pressurize the fresh ethylene to the pressure of the ethylene recycle system. In some existing ethylene tubular reactor plants, the ethylene discharged from the primary compressor is divided into two streams, one stream being combined with recycled ethylene and fed to the suction of the secondary compressor, and the other stream being injected into the ethylene/polymer mixture downstream of the high-pressure, let-down valve, thereby providing rapid cooling of the ethylene/polymer mixture prior to entry into the product separation unit. In the process of the invention, preferably substantially the entire output of the primary compressor is fed to the secondary compressor.

Make-up ethylene is typically supplied to tubular reactor facilities at pressures from about 15 to 90 bar. Regardless of the ethylene supply pressure, in the process of the invention the primary compressor should have an ethylene gas throughput of at least 55 tonnes/hour. Preferably, the primary compressor operates at a gas throughput in the range of from 60 tonnes/hour to 120 tonnes/hour, more preferably in the range of from 70 to 110 tonnes/hour and especially preferably in the range of from 80 to 100 tonnes/hour. As well as fresh make-up ethylene, the primary compressor may also receive ethylene recycled from the low pressure end of the product separation unit and from the primary and secondary compressor leakage systems.

It is also preferable to direct a small fraction of one of the ethylene recycle streams to a purge stream to limit build-up of inert components in the reactor system. In principle, the proportion of the total reactor gas throughput which is sent to the purge stream is typically in the range of from below 1 to 15%.

The discharge pressure of the primary compressor is matched to the pressure of the high pressure ethylene recycle system and may be, for example, in the range of from 270 bar to 350 bar, and is preferably in the range of from 280 bar to 320 bar. Also, the ethylene is preferably cooled after exit from the primary compressor and prior to entry into the secondary compressor.

The precise design of the primary compressor is not critical. However, in a favoured embodiment, the primary compressor is a reciprocating compressor having at least 8 cylinders, preferably between 8 and 12 cylinders.

The secondary compressor compresses the ethylene to a pressure of at least 2300 bar for supply to the tubular reactor. As discussed with regard to the primary compressor, the secondary compressor is preferably a unit driven by a single motor, but may alternatively comprise two or more compressors in series or in parallel driven by separate motors. Any configuration of compressors, including the configuration described in greater detail below, is intended to be within the scope of this disclosure as long as said configuration is adapted to compress the ethylene from the intermediate pressure (of the ethylene as it leaves the primary compressor) to the desired reactor pressure, 2300-3100 bar. The secondary compressor is mechanically complex and is subject to very high mechanical forces, but is nonetheless required to operate at a high throughput reliably and safely over a lifetime which may be several decades. Accordingly, the successful design and operation of the secondary compressor is critical to the viability of the process and is one of the key aspects of the invention. However, the mechanical demands on the secondary compressor, particularly the loads applied through the drive train, increase as the required throughput increases.

Secondary compressors for use with tubular polymerization reactors are typically two-stage reciprocating compressors having, say, six or eight cylinders arranged in a compressor frame and having a common crankshaft driven by an electric motor standing at one end of the compressor frame. It is usually necessary to mount the compressor on foundations specially adapted to minimize vibration.

In order to create the necessary throughput, the secondary compressors must be modified in some manner to increase the amount of material that can be moved through the system. There are at least three ways that are suggested as potential possibilities of increasing throughput of a particular compressor including:

one approach to developing secondary compressors of higher throughput has been to increase the size of the cylinders. However, that approach suffers from the disadvantage of also increasing the loads applied to the components of each cylinder, particularly to the plungers and connecting rods;

a second approach has been to increase the number of cylinders in the cylinder frame. However, that approach requires both an increase in the length of the crankshaft and an increase in the power transmitted through the crankshaft and those factors limit the number of cylinders which it is practicable to include in a compressor frame; and a third approach has been to add, where possible, a second compressor frame on the other side of the motor. However, that approach suffers from the problems related to strains caused in the couplings between the motor and each cylinder frame, due to misalignment of the two compressor frame crankshafts.

The process of the invention preferably utilizes as secondary compressor a two-stage reciprocating compressor having at least 14 cylinders which compresses the ethylene to a pressure of at least 2300 bar at a throughput of at least 120 tonnes/hour.

In one embodiment, the secondary compressor comprises a motor and a single compressor frame driven by the motor. In that embodiment, it is preferred that the cylinders be relatively large in order to achieve a relatively high throughput per cylinder. However, larger cylinders, whether the increase in size is due to an increase in stroke length or an increase in plunger diameter or a combination of the two, impose correspondingly greater loads on the drive train end and on the high pressure piping support and, therefore, it is preferred that the single compressor frame comprises no more than 16 cylinders, in order to restrict the length of the crankshaft. In that embodiment, the secondary compressor preferably operates at a speed of from 150 to 200 rpm.

In a preferred embodiment, the secondary compressor comprises a motor and two cylinder frames arranged on opposite sides of the motor. In this embodiment, the cylinders may be smaller than where a single frame is used for comparable throughput. In this embodiment, the secondary compressor preferably has 16, 18, 20, 22, or 24 cylinders, but may have up to 32 cylinders (16 on either cylinder frame). Advantageously, each cylinder frame has no more than 12 cylinders. Advantageously, a first cylinder frame has an equal number of cylinders as a second cylinder frame. The operating speed of the two-frame compressor is preferably within the range of from 180 to 250 rpm.

Where the secondary compressor has two cylinder frames it will, typically, be necessary to couple at least one of the cylinder frames to the motor via a flexible coupling. Whilst it is within the scope of the invention for each of the two frames to be connected to the motor via a flexible coupling, it is preferred to have only one coupled with a flexible coupling, the other compressor frame being coupled to the motor via a rigid coupling; rigid couplings being less costly and more robust than flexible couplings. The flexible coupling may be:

of the type which includes two packs of metal membranes, each membrane being relatively thin, for example, less than 2 mm thick, joined by an axially-disposed rigid metal member, one membrane pack being connected to the driveshaft of the motor and the other being connected to the crankshaft of the compressor frame such that the torque is transmitted through each of the membrane packs and misalignment of the crankshaft and driveshaft is accommodated by flexing of the membranes as they rotate; or alternatively, the flexible coupling may be a flexible coupling as described in our patent application filed concurrently herewith.

Where the secondary compressor comprises two compressor frames, preferably one frame is dedicated to the first stage of compression and the other frame is dedicated to the second stage, thereby minimizing the complexity of the piping runs between stages. The piping in the vicinity of the secondary compressor, which has an operating speed in the range of from 150 to 300 rpm and preferably from 180 to 250 rpm, will be subject to significant vibration as well as high pressure, and must be constructed accordingly. Preferably, the piping from the first stage cylinders to the cooler (if present) and/or from the cooler (if present) to the second stage cylinders and/or from the first stage cylinders to the second stage cylinders has a diameter in the range of from 50 to 80 mm.

The gas throughput through the secondary compressor is preferably in the range of about 160 to 190 tonnes/hour, although higher throughputs may be required at an especially large scale or for instances where for particular reasons it is desired to operate at a lower conversion, for example, because of constraints on the reactor pressure. In one embodiment, the throughput through the secondary compressor is in the range of from 140 to 210 tonnes/hour, more preferably from 170 to 210 tonnes/hour, at a pressure in the range of from 2300 to 2750 bar.

The secondary compressor compresses the ethylene to a pressure of at least 2300 bar. In one embodiment, the pressure is in the range of from 2800 to 3100 bar, especially from 2900 to 3100 bar. Whilst operation at pressures higher than 3100 bar is feasible, and might enhance conversion, operation at such high pressures has the disadvantages that the loads on the secondary compressor are increased and that the wall thickness of the tubular reactor must be increased, which increases cost and reduces the heat transfer capability across the wall thereby requiring an increase in the length of the tubular reactor in order to conduct away the heat of polymerization. The latter disadvantage is especially significant when operating at the scale of the process of the invention and accordingly pressures below 3100 bar are preferred.

The temperature of the ethylene must be controlled in order to allow load balancing between the two compressor stages thereby optimizing/maximizing the compressor throughput. Typically the ethylene is cooled between the first and the second stages of compression in the secondary compressor. That may be done by passing the ethylene through tubes provided with a cooling jacket, typically a water jacket.

The interstage pressure, that is, the pressure between the first and second stages of secondary compressor will typically be in the range of 1100 bar to 1600 bar.

Upon leaving the secondary compressor, at least a portion of the ethylene passes to the front end of the tubular reactor.

In a preferred embodiment, the ethylene discharged from the secondary compressor is divided into more than one stream, one of which enters the front end of the tubular reactor and the other or others enter as sidestreams at points along the length of the tubular reactor. In a particularly preferred embodiment, the ethylene discharged from the secondary compressor is split into 4, 5, 6, or 7 streams, with one stream going to the front end of the tubular reactor and the others entering as sidestreams. The streams may be of unequal volume, thereby providing flexibility in tailoring of the volume of ethylene entering each reaction zone in the tubular reactor.

The ethylene which is introduced into the front end of the tubular reactor is heated to at least 95° C., preferably at least 135° C., or in some cases at least 160° C. in order to promote the decomposition of the initiator and start the polymerization reaction. The initiator is injected at at least three different points along the length of the tubular reactor, thereby defining at least three reaction zones.

Polymerization commences immediately downstream of the first reaction zone thereby causing the temperature of the reaction mixture to rise due to the exothermic nature of the polymerization. As the temperature rises, initiator decomposition and polymerization increase in rate, accelerating the heat generation and causing the temperature to rise further. As initiator is consumed, initiation and polymerization slow and, at the point where heat generation equals heat conducted away from the reaction mixture, the temperature peaks and then begins to fall.

Thus, as the reaction mixture travels along the length of the reactor, the temperature of the reaction mixture increases to a peak and then decreases until the next initiator injection point is reached, whereupon the process begins again. The zones downstream of initiator injection points in which the polymerization reaction occurs are known to the skilled person as reaction zones. The tubular reactor will generally be equipped with at least one temperature regulated heating/cooling jacket in each reaction zone.

In the embodiment in which the ethylene discharge from the secondary compressor is split into two or more streams, with one stream entering the front end of the reactor and the other stream(s) entering as sidestream(s), the sidestream(s) typically enter(s) the reactor upstream of an initiator injection point, preferably after being cooled, for example, to between 10 and 20° C., before entry into the reactor in order to reduce the temperature of the reaction mixture. As mentioned above, the total conversion of monomer to polymer along the length of the reactor is, in practice, limited by the ability to cool the reaction mixture, and so cooling the sidestreams can allow an increase in conversion for a given reactor.

The peak temperature for each reaction zone will advantageously be in the range of from 200° C. to 350° C. Preferably, in at least one reaction zone the peak temperature will be in the 280° C. to 340° C. range, preferably from 290° C. to 315° C. The increase in temperature in a reaction zone is proportional to the amount of polymer made in that reactor zone and so operating at high peak temperatures favours high conversion. However, the kinetics of ethylene polymerization are such that as the temperature rises, chain transfer to polymer increases relative to propagation of linear chains and the polydispersity index increases, resulting in an increase in the haze value of the polymer produced. Accordingly, when it is desired to manufacture a low haze grade of polymer, it will be necessary to operate at lower peak temperatures. Preferably, in each reaction zone upstream of an initiator injection point (i.e., in all but the last reaction zone) the reaction mixture is cooled to at least 20° C., more preferably to at least 40° C., and most preferably to at least 50° C., below the peak temperature of that reaction zone before the reaction mixture reaches the next initiator injection point.

The cooling in any reaction zone may be by means of a cooling jacket or a combination of a cooling jacket and introduction of a sidestream of cooled ethylene.

In the process of polymerizing ethylene in a tubular reactor, once the desired throughput of ethylene through the secondary compressor and into the reactor is established, the pressure in the reactor is controlled by the high-pressure, let-down valve, through which the product mixture exits the reactor. Opening the valve decreases pressure in the tubular reactor; closing the valve increases the pressure. Moreover, a pressure drop exists along the length of the tubular reactor which forces the reaction mixture along the reactor at a desired velocity (the term "reactor pressure" herein refers to the maximum pressure in the reactor, that is, the pressure immediately downstream of the secondary compressor, unless another meaning is obvious from the context). The velocity of the reaction mixture through the reactor is believed to be of critical importance to the effectiveness of the heat transfer out of the reactor. It is theorized that at low velocity laminar flow and build-up of thicker layers of polymer on the inside of the reactor tubes inhibits heat transfer away from the reaction mixture.

However, the pressure drop over the length of the reactor is limited by the requirement that the pressure must not fall below the point at which phase separation for the reaction mixture occurs. The pressure drop for a given throughput can be reduced by increasing the internal diameter of the tubular reactor. However, increased tube diameter also makes effective cooling of the reactor mixture more difficult.

A further factor relating to reactor kinetics is that providing an increased number of reaction zones generally allows improved conversion of ethylene to polymer, thereby improving the economics of the process. However, increasing the number of reaction zones generally requires an increase in the length of the reactor, necessitating increased tube diameters to balance the consequent effects of pressure drop and reactor flow velocity.

The inventors believe that it is possible to balance the above factors in the process of the invention, having a throughput through the secondary compressor of at least 120 tonnes/hour of ethylene at a pressure of at least 2300 bar, by providing a tubular reactor having a maximum internal diameter of at least 65 mm and a length of at least 1.5 km and introducing initiator at at least three separate locations to give at least three separate reaction zones and achieving a conversion of at least 28% whilst maintaining a pressure drop over the length of the tube reactor such as to maintain a flow velocity in the tubular reactor of at least 6 m/s. The inventors believe that the combination of features which define the process of their invention, therefore, makes possible the manufacture of polyethylene and ethylene copolymers in a tubular reactor in an efficient and reliable way which can be sustained over a plant lifetime of several decades without experiencing an unacceptable level of equipment failure.

The maximum internal diameter of the tubular reactor of the invention is at least 65 mm in order to keep the pressure drop over the length of the reactor to an acceptable level. In the embodiment in which a portion of the ethylene discharged from the secondary compressor enters the tubular reactor as sidestreams, it will be desirable for the reactor to have regions of differing internal diameter increasing in stages down the length of the reactor as sidestreams enter. For example, for a process having a secondary compressor throughput of around 160 tonnes/hour at 3000 bar, 20% of which enters the front end of the tubular reactor and the rest enters as sidestreams, the tubular reactor may initially have a diameter in the region of 35 to 40 mm, and at the entry point of the first sidestream the internal diameter will increase, the increase being dependent on the size of that sidestream, and so on until after the last sidestream, the final internal diameter is in the region of 75-80 mm.

The particular maximum internal diameter of a tubular reactor chosen for any process according to the invention will be dependent upon the throughput of the secondary compressor, on the output pressure from the secondary compressor and on the length of the tubular reactor employed, all of which relate to the pressure drop experienced over the length of the reactor. The tubular reactor preferably has a length in the 1500 m to 5000 m range, more preferably from 3000 m to 4500 m.

In one favoured embodiment, the secondary compressor output pressure is relatively low, in the region of 2300 to 2700 bar, and at least 50% of the output of the secondary compressor enters the tubular reactor as sidestreams which help to cool the reactor contents, thereby making possible a relatively short reactor (for example, having a length in the region of from 1500 to 4000 m). At a secondary compressor throughput of more than 120 tonnes/hour, the reactor maximum internal diameter is at least 70 mm, and at throughputs above 150 tonnes/hour, the reactor maximum internal diameter is at least 80 mm, preferably in the range of from 80 to 90 mm.

In another favoured embodiment, the output pressure from the secondary compressor is again in the range of from 2300 to 2700 bar, and the whole output enters the front end of the reactor with no sidestreams being employed. In that embodiment, the tubular reactor, optionally, has a length in the 3000 m to 5000 m range, in order to provide sufficient cooling via cooling jackets, and a larger tube diameter is desired. For example, for throughputs in excess of 120 tonnes/hour a tube maximum internal diameter of at least 75 mm and for throughputs in excess of 150 tonnes/hour, a tube maximum internal diameter of at least 85 mm and, optionally, as much as 100 mm.

In a third favoured embodiment, the output pressure of the secondary reactor is in the range of from 2900 to 3100 bar, and at least 50%, more preferably at least 70%, of the ethylene enters as sidestreams, the tubular reactor has a length in the 1500 to 4000 m range. For a secondary compressor throughput in excess of 120 tonnes/hour, the tube maximum internal diameter is at least 65 mm and for throughputs above 150 tonnes/hour the tube maximum internal diameter is at least 70 mm, for example between 70 and 80 mm.

In the process of the invention, polymerization in the tubular reactor is carried out in at least three reaction zones, each reaction zone commencing at an initiator injection point. In each reaction zone, ethylene is converted to polymer and, therefore, having a larger number of reaction zones will generally increase conversion. However, each reaction zone will typically necessitate increasing the length of the tubular reactor and, therefore, will increase the pressure drop across the reactor. Preferably, the initiator is injected at 4, 5, or 6 different points along the tubular reactor thereby giving rise to 4, 5, or 6 reaction zones.

The process of the invention requires that the pressure drop over the length of the tube reactor be maintained at a level such as to maintain a flow velocity of the reaction mixture in the tubular reactor of at least 6 m/s. It has been found that the flow velocity influences the efficiency of cooling of the reaction mixture by heat transfer through the reactor tube walls, and that the heat transfer is particularly poor at low flow velocities. The actual minimum flow velocity which is desirable depends on the temperature of the cooling jacket. Where the cooling jacket contains fluid at a temperature below 50° C., and particularly below 30° C., such as water which is maintained at low temperature by cooling means such as a cooling tower, then the flow velocity will preferably be at least 14 m/s in order to inhibit formation of a solid polymer layer on the inside of the tubular reactor which itself further inhibits heat transfer (even then, it may be necessary to allow the temperature of the cooling jacket in a particular reaction zone to rise periodically, in order to disperse any polymer layer which has formed). Accordingly, the flow velocity may be in excess of 14 m/s and is advantageously significantly higher, for example, in the range of from 14 to 20 m/s.

Alternatively, factors arising from the design of a particular facility may make it desirable for the fluid in the cooling jacket to be at a temperature substantially above 50° C., for example, where it is desired to produce steam from the cooling water, in which case the temperature of the jacket will be in excess of 100° C. At such temperatures, the formation of polymer layers in the reactor tubes is unlikely to occur, and it is therefore feasible to operate the process with a flow velocity as low as 6 m/s. Preferentially, the flow velocity may be in the range of from 8 to 14 m/s.

The proportion of the total ethylene which enters the tubular reactor, whether in the front end stream or as a sidestream, which is converted to polymer before exiting the reactor is referred to as the conversion. In the process of the invention, the conversion is at least 28%. Conversions of higher than 40% are feasible but are not preferred, partly because the viscosity of the reaction mixture increases with its polymer content, which leads in turn to an increase in the pressure drop required to maintain the necessary flow velocity.

The conversion achieved is in part related to the pressure at which the reactor operates, with a higher front end pressure both increasing the rate of polymerization and making possible a greater pressure drop over the length of the reactor. However, operating at higher pressures imposes more strain upon the secondary compressor and also increases the energy consumption with a consequent cost disadvantage. For such reasons, it may be desirable in some instances to operate at a pressure of from 2300 to 2800 bar at a relatively low conversion, which may be, for example, approximately in the region of from 28 to 32%. Alternatively, it may be desirable to operate at a pressure in the region of 2800 to 3100 bar at a high conversion, for example, in the range of from 32% to 37%. However, pressure is only one of the factors which influence conversion and overall a conversion in the region of from 30 to 40% is preferred, with a more preferred range being from 30 to 37%.

As mentioned above, the reactor pressure is controlled by operation of a high-pressure, let-down valve which is located at the downstream end of the tubular reactor. Whilst the flow exiting from the reactor could be divided into more than one stream with each stream passing through a respective high-pressure, let-down valve, in practice, it is preferred for there to be only one such valve, and for the entire output of the reactor to pass through it.

In a number of existing tubular reactor facilities, part of the ethylene discharge from the primary compressor is cooled and diverted in a separate stream to a location immediately downstream of the high-pressure, let-down valve (ethylene quench), to act as a rapid quench cooling of the product mixture. Preferably, however, all of the ethylene discharged from the primary compressor is conducted into the secondary compressor and subsequently into the tubular reactor, in order to maximize the amount of polymer produced and alternative means are provided for cooling the product mixture.

The combination of high throughput and the factors mentioned above relating to pressure drop over the length of the reactor make it undesirable in the process of the invention to provide more cooling capacity in the last reaction zone than is necessary to control the polymerization exotherm in the last reaction zone. Preferably, the temperature of the product mixture at the high-pressure, let-down valve is in the range of from 260 to 290° C. Accordingly, downstream of the high-pressure, let-down valve and upstream of the product separator, further cooling means is provided. As mentioned above, an ethylene quench is not preferred. Instead, a preferred form of cooling means is a product cooler comprising a conduit having a cooling jacket. The product cooler typically has a length in the range of from 200 m to 500 m, preferably from 300 m to 450 m. As the pressure downstream of the high-pressure, let-down valve is much lower than inside the reactor, the walls of the product cooler may be thinner than the walls of the reactor tubes, thereby improving heat transfer. However, the depressurization causes phase separation of the product mixture and therefore the dimensions of the product cooler must be such as to maintain a flow velocity such that the polymer remains dispersed in the flow and does not adhere to the walls. An especially suitable form of product cooler has an internal diameter of at least 60 mm and a length of at least 200 m. A higher product velocity in the product cooler also improves heat transfer. Preferably, the product cooler reduces the temperature of the product mixture to the 170° C. to 280° C. range, preferably 220° C. to 260° C., more preferably from 230° C. to 250° C. In the product cooler, immediately upstream of the first stage of the product separation unit, the pressure is preferably in the range of from 200 to 350 bar.

From the product cooler the product mixture will typically flow directly into the first stage of the product separation unit.

The product separation of the process of the invention may be carried out in a single stage. However, two stage separation is generally preferred. In the first stage, known as the high pressure separator, the first separation of polymer from unreacted ethylene is carried out. The separated gas is fed to the high pressure recycle system for return to the secondary compressor. The molten polymer in the bottom of the high pressure separator is decompressed into a second stage, known as a low pressure separator, and almost all of the remaining ethylene is separated from the polymer and is sent to the purge gas compression system. Preferably, the pressure in the high pressure separator is in the range of from 200 to 350 bar. Preferably, the pressure in the last stage of the product separator is in the range of from 1 to 10 bara, more preferably from 1 to 3 bara.

The polymer melt from the final stage of the product separator will typically be fed to one or more hot melt extruders, for combination with additives, extruding and pelletizing, as is conventional.

The invention also provides a production plant or apparatus for the manufacture of polyethylene and polyethylene copolymers comprising a primary compressor capable of a throughput of at least 55 tonnes/hr arranged to supply compressed ethylene to a two-stage reciprocating secondary compressor having at least 14 cylinders and being capable of compressing ethylene at a throughput of at least 120 tonnes/hr at a pressure of at least 2300 bar, the secondary compressor communicating, via a conduit provided with heating means to enable at least a portion of the compressed ethylene to be heated to at least 95° C., with the front end of a tubular reactor, the secondary compressor optionally communicating via one or more further conduits with one or more points downstream of the front end of the tubular reactor for the supply of one or more ethylene sidestreams to the tubular reactor, the tubular reactor having at least three inlets for the injection of initiator thereby defining at least three reaction zones and being provided with a heating/cooling jacket in each reaction zone, the tubular reactor having a maximum internal diameter of at least 65 mm and being provided with a high-pressure, let-down valve, the production plant further comprising, a cooling means arranged downstream of the high-pressure, let-down valve, a product separation unit, preferably having at least two stages, and at least one conduit for the transfer of recycled ethylene from the product separation unit to the secondary compressor.

Copolymerization

As well as ethylene homopolymers, the process of the invention may be used for the manufacture of ethylene copolymers such as ethylene-vinyl acetate copolymers. Typically the comonomer(s) will be pressurized and injected into the secondary compressor at one or more points. Other possible comonomers include propylene, 1-butene, iso-butene, 1-hexene, 1-octene, other lower alpha-olefins, methacrylic acid, methyl acrylate, acrylic acid, ethyl acrylate and n-butyl acrylate. Reference herein to "ethylene" should be understood to include ethylene and comonomer mixtures, except where another meaning is implied by context.

Modifier

The process of the invention will often involve the use of a modifier to control the molecular weight of the product polymer by promoting chain transfer. Examples of chain transfer agents include tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichloroethane, acetronitrile, N-ethylacetamide, propylene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1, 2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1, 1,2-dibromoethane, dimethylamine, benzaldehyde, chloroform, 2-ethylhexene-1, propionaldehyde, 1,4 dichlorobutene-2, tri-n-butylphosphine, dimethylphosphine, methyl cyanoacetate, carbon tetrachloride, bromotrichloromethane, di-n-butylphosphine, acetaldehyde, and phosphine.

For further details of transfer agents, see *Advances In Polymer Science*, Vol. 7, pp. 386-448, (1970). Table 7 therein ranks several transfer agents in order of the chain transfer constant determined under set conditions. The tendency to copolymerize is indicated by the reactivity, also determined under set conditions.

The modifier can be added into the reaction mixture in any suitable way. For example, the modifier may be injected into the inlet pipes feeding one or more of the secondary compressor first stage cylinders. The modifier is, in general, not fully consumed during one pass through the reactor and is generally also present in the recycle ethylene returning to the secondary compressor.

Initiators

Initiators are used to initiate the free radical ethylene polymerization and many suitable initiators will be known to the skilled person. Organic peroxide initiators are preferred. Typically, a blend of several initiators having different half-life temperatures will be used in order to achieve the desired reaction kinetics.

The pure peroxides are mixed, typically in a hydrocarbon solvent, and are then injected into the tubular reactor at the initiator injection locations. Any suitable pump may be used, for example, a hydraulically driven piston pump.

The present invention may be better understood with reference to the drawings.

FIG. 1 is a schematic of a polymerization plant 1 including an ethylene feed line 2 which supplies fresh ethylene to a primary compressor 3. The ethylene discharged from the primary compressor 3 flows via conduit 4 having a valve 4a to the secondary compressor 5. Also entering the secondary compressor 5 is a stream of fresh modifier(s) and/or optional comonomer(s) and a stream of recycled ethylene. The fresh modifier stream is supplied by a separate modifier pump 6. The recycled ethylene comes from the high pressure recycle system 7.

The secondary compressor 5 is described in more detail below. The secondary compressor 5 discharges compressed ethylene in five streams 8a, 8b, 8c, 8d, and 8e. Stream 8a accounts for 20% of the total ethylene flow. Stream 8a is heated by a steam jacket (not shown) which heats the ethylene, prior to entry into the front end of the tubular reactor 9. The four remaining ethylene side streams 8b, 8c, 8d, and 8e each enter the reactor as sidestreams. Sidestreams 8b, 8c, 8d, and 8e are cooled. The tubular reactor 9 is also shown with six initiator inlets 10a to 10f which are spaced at intervals along reactor 9 and are fed from an initiator mixing and pumping station 11. The first initiator injection point 10a is just downstream of the front end of the reactor 9 and defines the start of the first reaction zone. Initiator entering through that first initiator inlet 10a combines with the hot ethylene from stream 8a and polymerization begins, raising the temperature of the ethylene as it travels down tubular reactor 9. A heating/cooling jacket (not shown) fitted on reactor 9 cools the reaction mixture and the temperature of the reaction mixture peaks at between 200-350° C., as initiator is consumed and the rate of polymerization begins to fall, and then begins to decline. Entry of the first sidestream 8b cools the reaction mixture further. The second initiator injection inlet 10b is just downstream of the entry point of sidestream 8b and defines the start of the second reaction zone. Once again, the temperature of the reaction mixture rises, peaks and falls as it flows along the tubular reactor 9 with the entry of the second sidestream 8c providing a further rapid cooling prior to entry of initiator at the third initiator inlet 10c, which defines the start of the third reaction zone. The third, fourth, fifth and sixth reaction zones are similar to the second reaction zone except that the sidestreams are optional with regard to the fifth and sixth reaction zones, and therefore the distance between the fifth and sixth initiator inlets 10e and 10f may be relatively long, in order to allow for a greater length of heating/cooling jacket.

Downstream of the sixth initiator inlet 10f and the sixth reaction zone, the tubular reactor terminates in a high-pressure, let-down valve 12.

In the region upstream of the injection point of the first sidestream 8b, the tubular reactor 9 has an initial internal diameter, which increases downstream of sidestream 8*b*, and increases further downstream of each subsequent sidestream until a maximum internal diameter of at least 65 mm, and preferably at least 70 mm is reached in the region downstream of the final sidestream 8*e*. That internal diameter profile allows the flow rate throughout the tubular reactor above 14 m/sec during normal operation under a secondary compressor throughput of 160 tonnes/hour and at an acceptable pressure drop across the reactor.

The high-pressure, let-down valve 12 controls the pressure in the tubular reactor 9. Immediately downstream of the high-pressure, let-down valve 12 is product cooler 13. Upon entry to the product cooler 13, the reaction mixture is in a phase separated state. It exits into high pressure separator 14. The overhead gas from the high pressure separator 14 flows into the high pressure recycle system 7 where the unreacted ethylene is cooled and returned to the secondary compressor 5.

The polymer product flows from the bottom of the high pressure separator 14 into the low pressure separator 15, separating almost all of the remaining ethylene from the polymer. That remaining ethylene is transferred either to a flare (not shown) or a purification unit (not shown) or is recycled via the primary compressor 3 from the product separation unit to the secondary compressor. Molten polymer flows from the bottom of the low pressure separator 15 to an extruder (not shown) for extrusion, cooling and pelletizing.

With respect to the various ranges set forth herein, any upper limit recited may, of course, be combined with any lower limit for selected sub-ranges.

All patents and publications, including priority documents and testing procedures, referred to herein are hereby incorporated by reference in their entireties.

Although the methods and systems described herein and their advantages have been described in detail, it should be understood that various changes, substitutions, and alterations could be made without departing from the spirit and scope of the inventions described herein as defined by the following claims.

What is claimed is:

1. A process for the manufacture of ethylene polymers and copolymers comprising the steps of:
    compressing ethylene in a primary compressor at a throughput of at least 55 tonnes/hour and then mixing that ethylene with recycled ethylene and further compressing the ethylene to a pressure of at least 2300 bar at a throughput of at least 120 tonnes/hour in a secondary compressor,
    heating at least a portion of the compressed ethylene to a temperature of at least 95° C. and introducing that heated ethylene into the front end of a tubular reactor having a maximum internal diameter of at least 65 mm and a length of at least 1500 m,
    introducing initiator into the tubular reactor in at least three separate locations, thereby defining at least three reaction zones, allowing the ethylene to polymerize, and cooling the reaction mixture in at least the first two reaction zones, such that at least 28% of the monomer is converted to polymer,
    maintaining a pressure drop over the length of the tubular reactor such as to maintain a flow velocity in the tubular reactor of at least 6 m/s,
    releasing the reaction mixture through a high-pressure, let-down valve, cooling the reaction mixture and separating the reaction mixture in a product separator into polymer and unreacted ethylene, and
    recycling unreacted ethylene.

2. A process as claimed in claim 1 in which the primary compressor is a reciprocating compressor having at least 8 cylinders and compresses the ethylene to a pressure of at least 200 bar.

3. A process as claimed in claim 1 in which the secondary compressor is a two-stage compressor and has 14 or 16 cylinders arranged in a single frame.

4. A process as claimed in claim 1 in which the secondary compressor has 14, 16, 18, 20, or 22 cylinders arranged in two separate frames.

5. A process as claimed in claim 1 in which the secondary compressor has a maximum of 32 cylinders arranged in two separate frames.

6. A process as claimed in claim 1 in which the throughput through the secondary compressor is in the range of from 140 to 210 tonnes/hr.

7. A process as claimed in claim 1 in which the portion of compressed ethylene is heated to at least 135° C. prior to introduction into the front end of the tubular reactor.

8. A process as claimed in claim 1 in which in each reaction zone upstream of an initiator injection point the reaction mixture is cooled to at least 20° C. below the peak temperature of that reaction zone.

9. A process as claimed in claim 1 in which the maximum internal diameter of the tubular reactor is at least 76 mm.

10. A process as claimed in claim 1 in which the initiator is injected at 4, 5, or 6 different points.

11. A process as claimed in claim 1 in which the flow velocity in the tubular reactor is in the range of from 8 m to 30 m/sec.

12. A process as claimed in claim 1 in which the conversion is in the range of from 28 to 40%.

13. A process as claimed in claim 11 in which the conversion is in the range of from 30 to 37%.

14. A process as claimed in claim 1 in which the reaction mixture is cooled in a product cooler arranged downstream of the high-pressure, let-down valve, the product cooler having a maximum internal diameter of at least 65 mm and a length of at least 200 m.

15. A process as claimed in claim 1 in which the product separator has two stages with the pressure in the first stage being in the range of from 250 to 350 bar and the pressure in the second stage being in the range of from 1 to 10 bara.

16. An apparatus for the manufacture of polyethylene and polyethylene copolymers comprising a primary compressor capable of a throughput of at least 55 tonnes/hr arranged to supply compressed ethylene to a two-stage secondary compressor and capable of compressing ethylene at a throughput of at least 120 tonnes/hr at a pressure of at least 2300 bar, the secondary compressor communicating, via a conduit provided with heating means to enable at least a portion of the compressed ethylene to be heated to at least 95° C., with the front end of a tubular reactor,
    the secondary compressor optionally communicating via one or more further conduits with one or more points downstream of the front end of the tubular reactor for the supply of one or more ethylene sidestreams to the tubular reactor,
    the tubular reactor having at least three inlets for the injection of initiator thereby defining at least three reaction zones and being provided with a heating/cooling jacket in each reaction zone, the tubular reactor having a maximum internal diameter of at least 65 mm and being provided with a high-pressure, let-down valve, the apparatus further comprising, a cooling means arranged downstream of the high-pressure, let-down valve, a product separator, and at least one conduit for the transfer of recycled ethylene from the product separator to the secondary compressor.

17. The apparatus of claim 16 in which the two-stage secondary compressor has at least 14 cylinders.

18. The apparatus of claim 16 in which the product separator has at least two stages.

* * * * *